United States Patent [19]

Rankin

[11] Patent Number: 5,381,703
[45] Date of Patent: Jan. 17, 1995

[54] GEARBOX COUNTERSHAFT DECOUPLER

[76] Inventor: Charles G. Rankin, 708 NW. 88th St., Kansas City, Mo. 64155

[21] Appl. No.: 48,106

[22] Filed: Apr. 15, 1993

[51] Int. Cl.$^6$ ............................................. F16H 3/08
[52] U.S. Cl. .................................................... 74/329
[58] Field of Search ................................. 74/329, 333

[56] References Cited

U.S. PATENT DOCUMENTS

| | | | |
|---|---|---|---|
| 1,225,851 | 5/1917 | Phillips et al. | 74/329 |
| 2,001,141 | 5/1935 | Kittilsen | 74/329 |
| 2,009,133 | 7/1935 | Gerst | 74/329 |
| 2,021,165 | 11/1935 | Barton | 74/329 |
| 2,106,841 | 2/1938 | Griswold | 74/329 |
| 2,117,654 | 5/1938 | Cotanch | 74/329 |
| 4,464,947 | 8/1984 | Windsor-Smith et al. | |
| 4,483,210 | 11/1984 | Mayuzumi | 74/329 |
| 4,565,106 | 1/1986 | Sumiyoshi | |
| 4,566,348 | 1/1986 | Akashi et al. | |
| 4,579,015 | 4/1986 | Fukni | |
| 4,597,304 | 7/1986 | Cataldo | |
| 4,882,951 | 11/1989 | Braun | |
| 4,960,005 | 10/1990 | Kashiwase | |
| 5,044,215 | 9/1991 | Watanabe | |

Primary Examiner—Dirk Wright

[57] ABSTRACT

A gearbox for automotive applications which includes an input shaft, an output shaft and a countershaft avoids driving the countershaft when in a direct drive mode by providing a selective coupling and decoupling mechanism. An input gear is mounted for free rotation about the input shaft when the gearbox is in a direct drive mode, thus eliminating the wasted energy in driving the countershaft and the change-speed gears thereon. When in a reduced or change-speed gear mode, the input gear is coupled for rotation with the input shaft to drive the countershaft. Alternatively, the countershaft may be provided with a countershaft input gear which can be selectively coupled and decoupled therefrom. The gearbox hereof preferably operates with a synchromesh gearbox and occupies no greater space and far less energy than conventional synchromesh gearboxes.

16 Claims, 4 Drawing Sheets

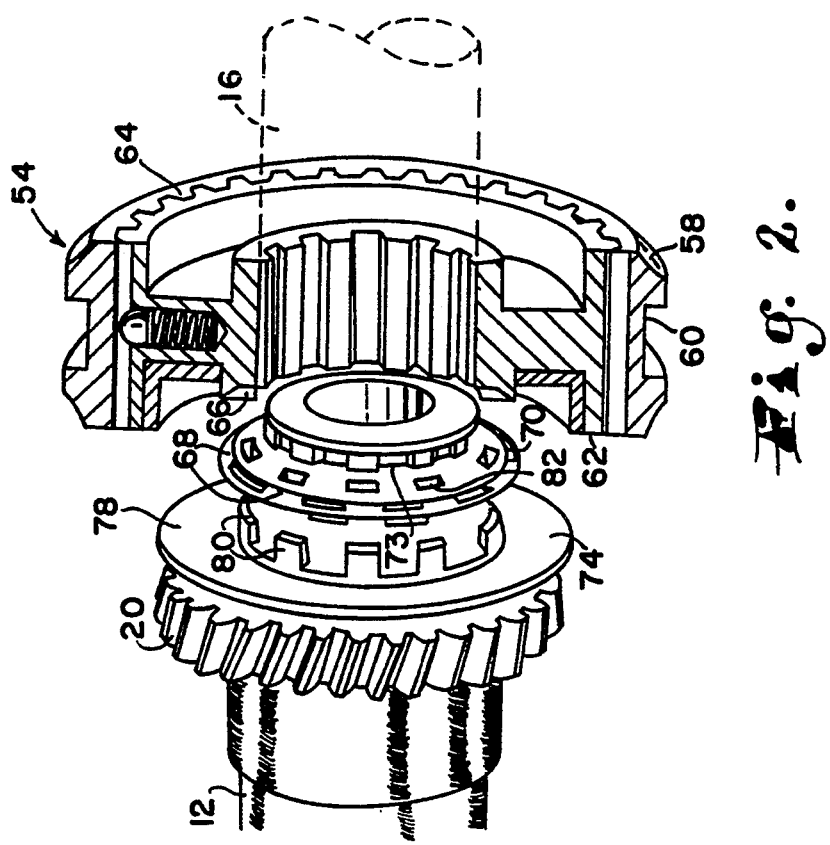
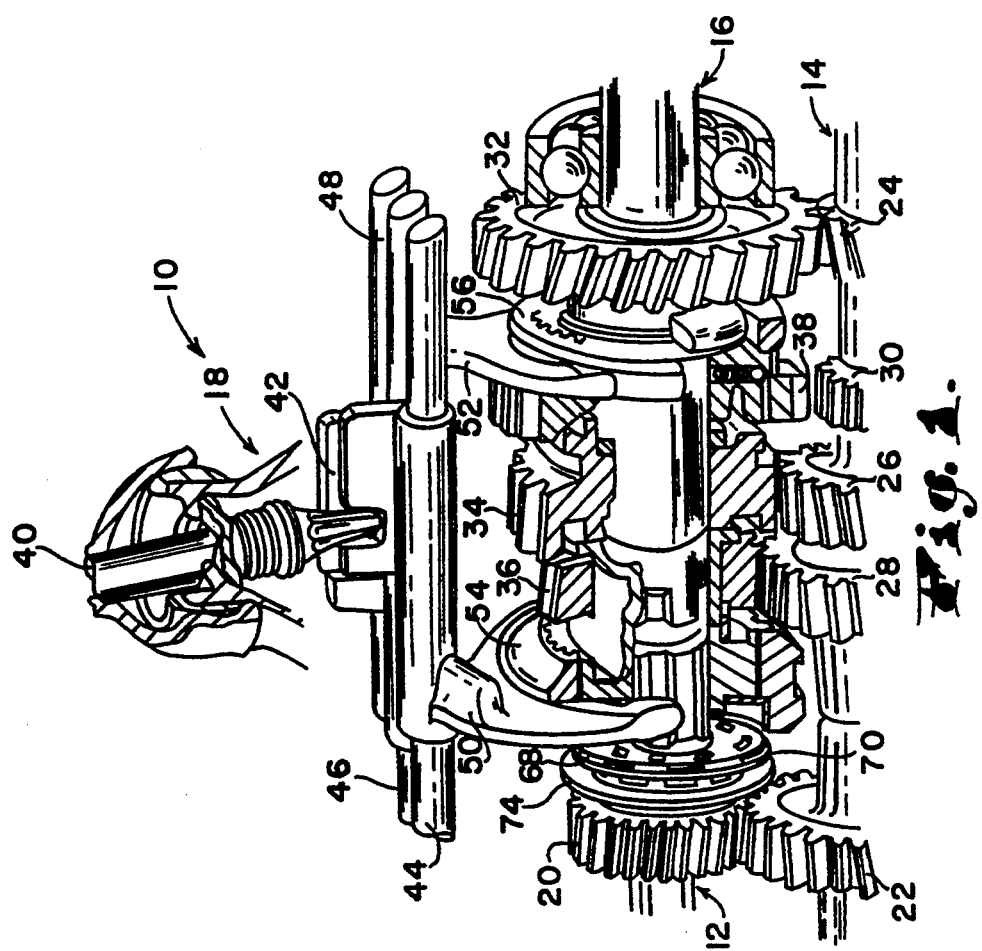

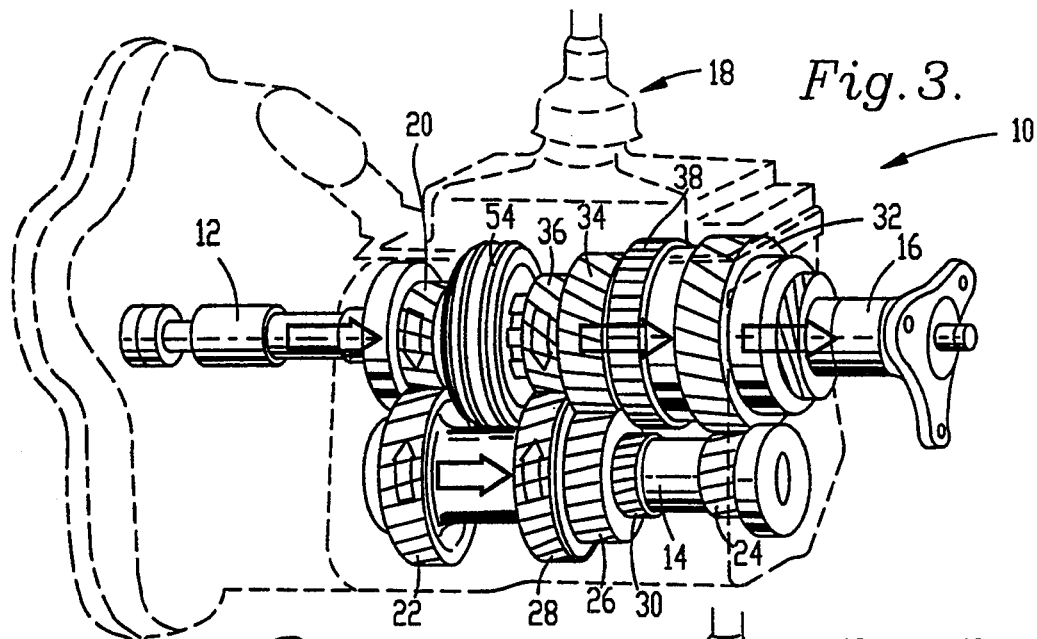
Fig. 3.
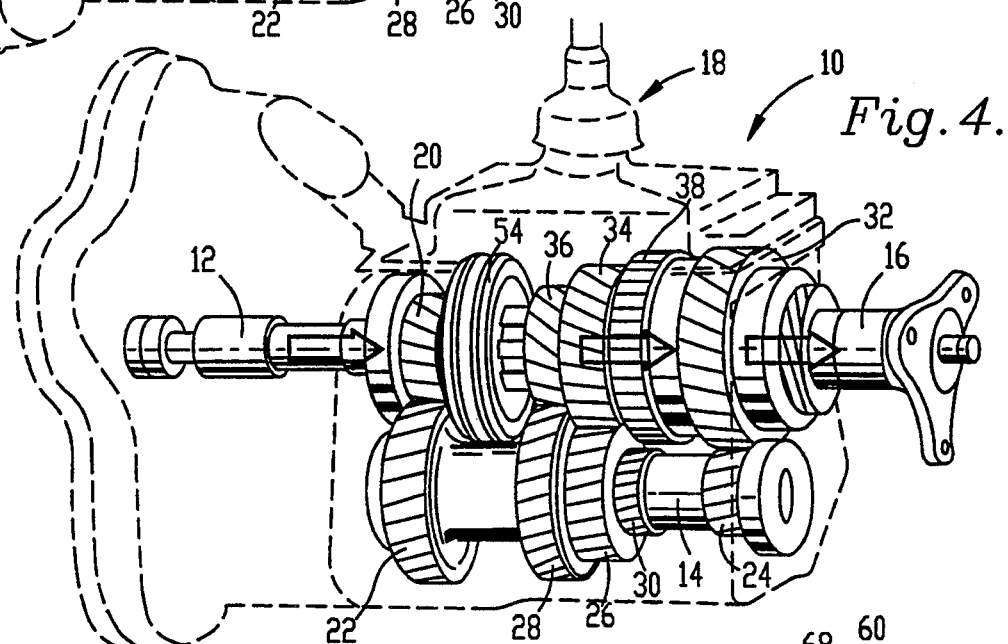
Fig. 4.
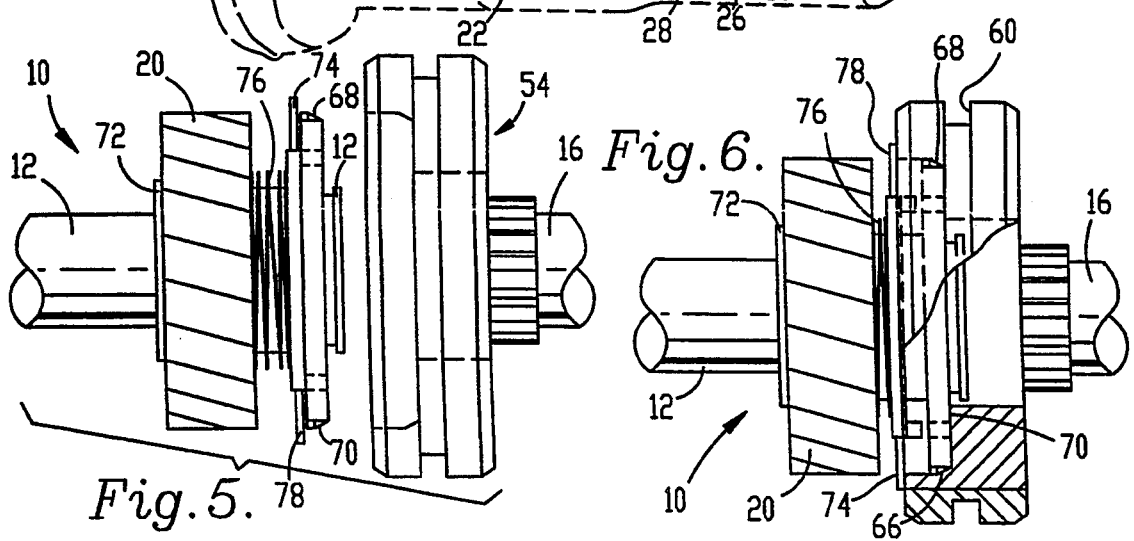
Fig. 5.
Fig. 6.

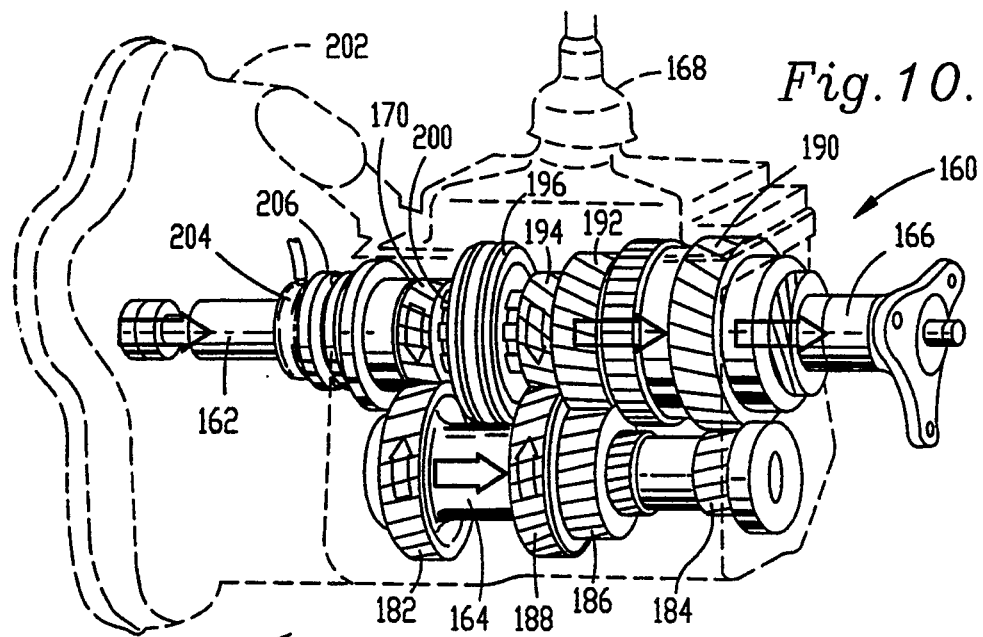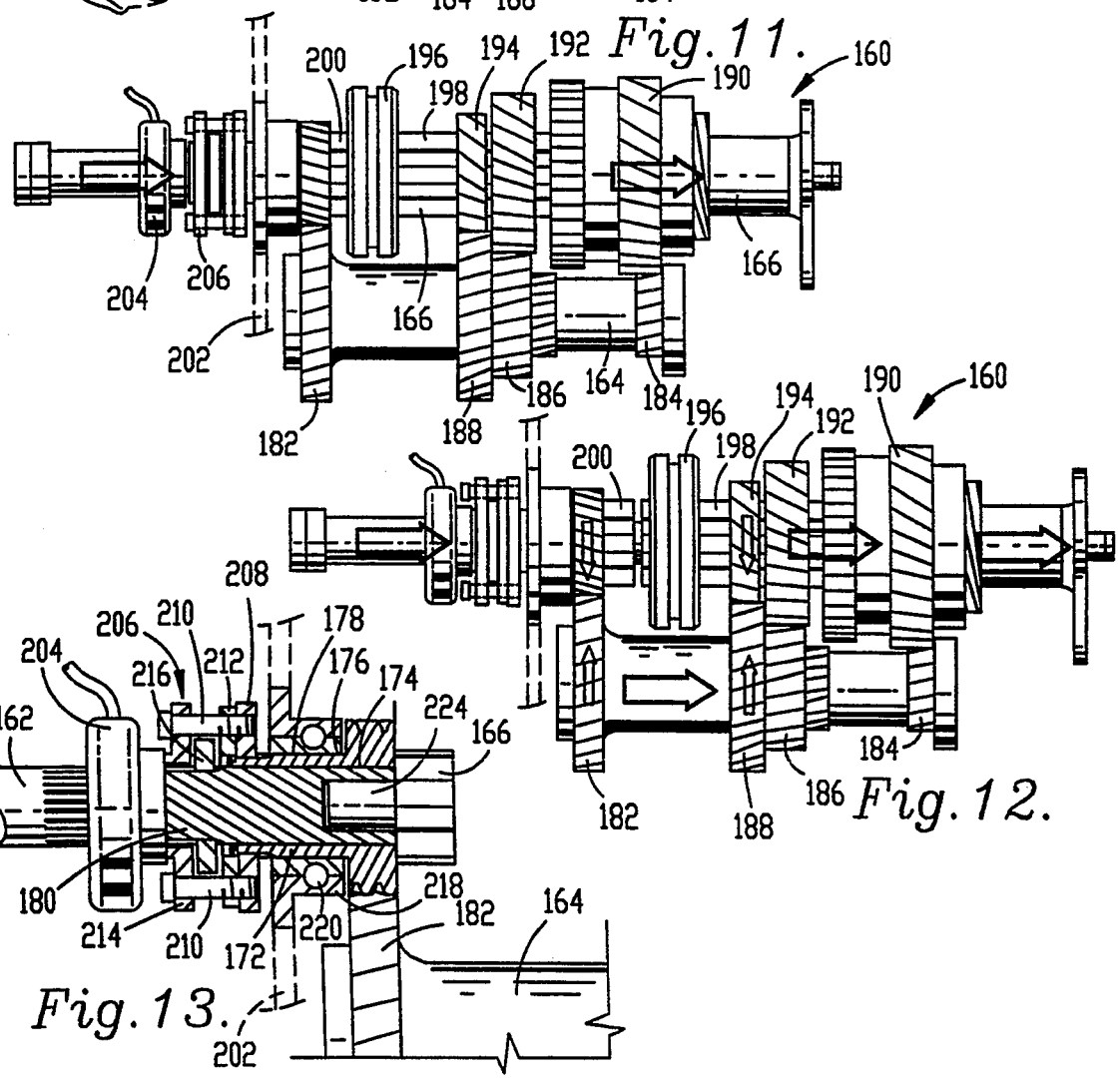

GEARBOX COUNTERSHAFT DECOUPLER

BACKGROUND OF THE INVENTION

1. Field of the Invention

This invention concerns an improved synchromesh gearbox which uses less energy than conventional gearboxes in a direct drive mode. More particularly, the gearbox hereof includes an countershaft carrying one or more change-speed gears which can be operatively decoupled from the gearbox input shaft when the gearbox is placed in a direct drive mode.

2. Description of the Prior Art

Of the types of power transmissions used in modern automobiles, synchromesh gearboxes are regarded as being among the most efficient and easiest to use. As a result, they are commonly employed in virtually all automotive applications such as, for example, passenger automobiles and trucks. The evolution of the synchromesh gearbox has avoided many of the problems of conventional gearboxes such as gear wear and the necessity of double-clutching.

Both conventional and synchromesh gearboxes include an input shaft which receives power from an engine, an output shaft, which transfers power to the driven wheels, and a layshaft or countershaft, which includes a number of change-speed gears. The countershaft is coupled to the input shaft by a countershaft input gear which meshes with and is driven by an input gear on the main shaft. Using a four-speed gearbox as an example, 1st, 2nd and 3rd gears are of a higher gear ratio, so that the input shaft turns more rapidly than does the output shaft in these gears. However, in 4th gear, the input shaft is directly coupled to the output shaft so that the input shaft turns at the same speed as the output shaft. When operating in 4th gear, or a direct-drive mode, no power is actually transmitted to the output shaft through the countershaft.

Notwithstanding the absence of any power transmission through the countershaft, synchromesh and conventional gearboxes drive the countershaft because the countershaft input gear is fixed to the countershaft and driven by the input gear of the input shaft. Because the countershaft is typically immersed in 90 weight SAE gearbox lubricant, a substantial amount of energy is consumed just in turning the countershaft and its gears. In fact, it is estimated that about one to ten horsepower of the power input into the gearbox is used in turning the countershaft when in a direct drive mode at normal highway speeds. This energy consumption is analogous to a fan blade pushing the lubricant as well as an oil pump where the highly viscous gearbox lubricant is forced between meshing teeth and produces no benefit when the gearbox is in a direct drive mode. If even a portion of this power loss can be avoided, a substantial improvement in overall performance and fuel economy of the automobile can be obtained.

It is thus an object of the present invention to present a practical solution to the problem of wasted power consumed by the countershaft when the engine is operating in a direct drive mode.

It is another object of this invention to develop a gearbox which can be used in virtually all automotive applications.

It is another object of this invention to develop a gearbox which can be substituted in size and application for a typical synchromesh gearbox without substantial additional cost.

It is another object of this invention to develop a gearbox which is readily adapted to use both in passenger cars and light trucks.

It is another object of this invention to develop a gearbox which is useful for racing applications.

SUMMARY OF THE INVENTION

These and other objects have been achieved by the gearbox of the present invention. The gearbox hereof provides an energy and performance saving alternative to typical synchromesh transmission by effectively operatively decoupling the countershaft from the input shaft when operating in a direct drive mode. By operatively decoupling the countershaft, between 20% and 35% less power is consumed in simply rotating the gearbox when operating in a direct-drive mode, with an anticipated corresponding improvement in fuel economy.

Generally speaking, the present invention uses an input shaft, an output shaft, and a countershaft. The countershaft and the output shaft employ at least one change-speed gearset in constant mesh relationship, and the input shaft includes an input gear while the countershaft is provided with a corresponding countershaft input gear. The input gear and the countershaft input gear are in constant mesh, as is customary. However, the present invention provides a mechanism for operatively coupling and decoupling the input shaft from the countershaft, to thereby avoid the necessity of turning the countershaft when in a direct drive mode.

The input shaft can be operatively decoupled from the countershaft in various ways, exemplified by the embodiments set forth herein. In one preferred embodiment of the present invention, the input gear is mounted for free rotation about the input shaft. A synchronizing hub is shiftable into direct drive mode, and is engagable with an engagement slider which is axially shiftable along the input shaft. The engagement slider is spring loaded to normally mesh with an engagement sprocket. When so meshed, the engagement slider is driven by the engagement sprocket which is coupled to the input shaft. The engagement slider, being operatively coupled to the input gear, then supplies power from the input shaft to the input gear (and thus through the countershaft for driving the change-speed gears). However, when the engagement slider is shifted out of meshing relationship with the engagement sprocket by the synchronizing hub, at the same time the synchronizing hub locks the input shaft to the output shaft in direct drive relationship, the input shaft is free to rotate within the input gear and thus no power is delivered to the countershaft.

In a second preferred embodiment of the present invention, primarily useful primarily in racing applications or those environments where a set of gears are no longer needed, as in gearboxes with two or more counter shafts, the input gear is fixed to the input shaft. It is operatively decoupled from the countershaft by separating the countershaft from the countershaft input gear. By using the gearshift lever to select the direct drive mode, the driver simultaneously activates a linkage. The linkage then moves a hub slidable along the countershaft to disengage from the countershaft. When the driver selects out of the direct drive mode, the linkage once again shifts the hub to engage the countershaft input gear to the countershaft and thereby also rotate the change-speed gears mounted thereon. Thus, while the input gear constantly drives the countershaft input gear, the change-speed gears mounted on the countershaft are not driven when the direct drive mode is selected.

In a third preferred embodiment of the present invention, again more suited to racing applications where the countershaft may include only a single change-speed gear, the input gear is again mounted on the input shaft for free rotation of the latter within the input gear. In this third embodiment, the input gear may be operatively coupled to the input shaft by the use of a clutch. When the clutch pedal of the driver is depressed, force is applied via a throw-out bearing to move the clutch assembly into engagement with the input gear. The input gear is thus operatively coupled to the input shaft when the clutch pedal is depressed so that power is supplied to the change-speed gear when the clutch is depressed and the driver's shift lever is moved into the change-speed gear select position. However, as most driving in certain racing situations is done in direct drive, lifting off of the clutch pedal causes the clutch assembly to operatively disconnect from the input gear and permit shifting to directly connect the input shaft with the output shaft. Thus, when the clutch pedal is lifted, power is supplied directly to the output shaft with no power being delivered via the input gear to the countershaft.

Advantageously, each of these embodiments accomplishes the same result—improved performance and fuel economy without any sacrifice. The energy used to drive the countershaft through the gearbox lubricant is waste, and it is a primary object of this invention to eliminate this waste. While a four-speed gearbox is shown in the drawings, a gearbox with five or more speeds could be easily accommodated by simply adding more change-speed gears to the countershaft and mating output gears to the output shaft. By lowering the rear axle ratio, say from 3:00/1:00 to 2:75/1:00 while increasing the ratios of the 1st, 2nd and 3rd change-speed gears, no overdrive gearing would be necessary and acceleration would not be adversely affected. Alternatively, separate, electrically selected overdrive units could be employed. It is believed that millions of gallons of fuel could be saved each year by avoiding the wasted energy spent driving the countershaft at highway speeds.

BRIEF DESCRIPTION OF THE DRAWINGS

FIG. 1 is a fragmentary perspective view of the input shaft, output shaft, countershaft and gearshift selector of a gearbox in accordance with a first embodiment of the present invention;

FIG. 2 is an enlarged fragmentary exploded perspective view of the first embodiment hereof showing the input gear, engagement slider, engagement sprocket and the synchronizing hub in section with the output shaft shown in phantom;

FIG. 3 is a diagrammatic view of the operation of the first embodiment of the present invention when the operator has selected operation in 3rd gear;

FIG. 4 is a diagrammatic view similar to FIG. 3 showing operation of the first embodiment in a direct drive mode;

FIG. 5 is an enlarged fragmentary right side elevational view of the first embodiment showing the input gear carrying the engagement slider separated from the output gear carrying the engagement sprocket and synchronizing hub;

FIG. 6 is an enlarged fragmentary right side elevational view similar to FIG. 5 but with the synchronizing hub shown in partial section to show the positioning of the engagement slider when moved by the synchronizing hub;

FIG. 10 is a diagrammatic view of a third embodiment of the present invention, showing a hydraulic throwout bearing engaged to operatively connect the input gear to the input shaft and drive the countershaft;

FIG. 11 is a fragmentary right side elevational view of the third embodiment showing the hydraulic throwout bearing disengaged resulting in operation of the gearbox in a direct drive mode;

FIG. 12 is a fragmentary right side elevational view similar to FIG. 11 showing the hydraulic throwout bearing engaged to operatively connect the input gear to the input shaft and drive the countershaft; and FIG. 13 is an enlarged, fragmentary vertical cross-sectional view of the third embodiment of the present invention, showing the throwout bearing in the disengaged position to permit the input shaft to rotate freely within the input gear.

DESCRIPTION OF THE PREFERRED EMBODIMENT

Figure 7:
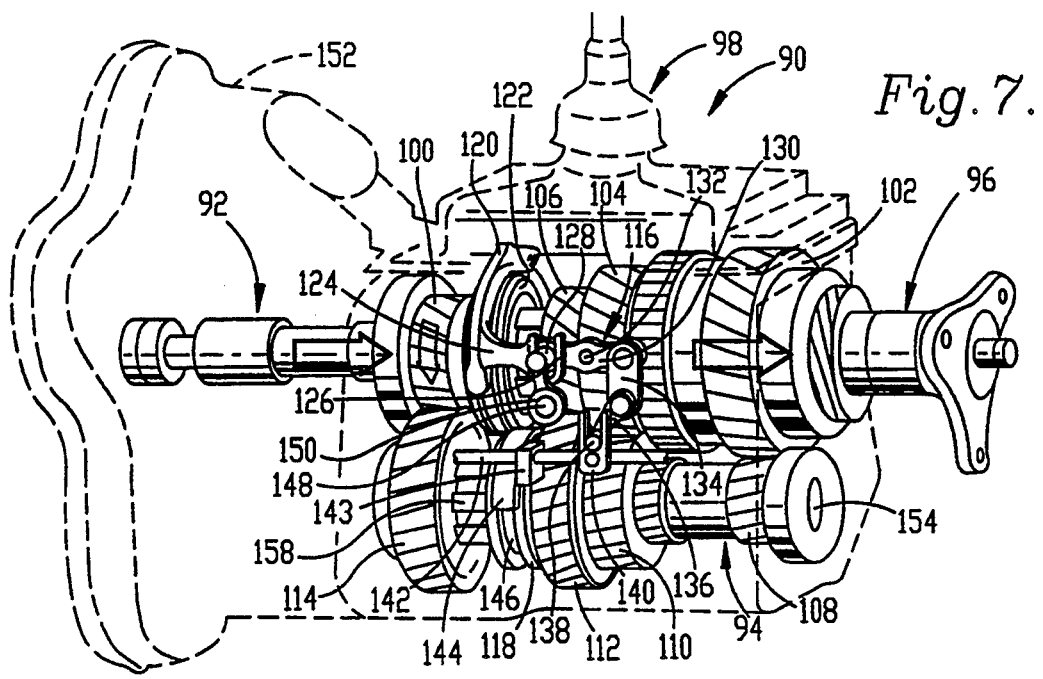
FIG. 7 is a diagrammatic view of a second embodiment of the present invention, showing the linkage and hub for the countershaft input gear in a direct drive position.

Manual gearboxes having synchromesh capabilities being known in the art, applicant submits herewith copies of pages 214 through 219 of Volume II of *How Things Work* published by Edito-Service, S. A., and copies of pages 2710 and 2711 from Vol 20 of *The New Illustrated Science and Invention Encyclopedia*, published by H. S. Stuttman, Inc. © Marshall Cavendish Limited 1987, 1989, the contents of which are specifically incorporated by reference in applicant's disclosure.

Referring now to the drawing, FIG. 1 shows a first embodiment of a gearbox 10 in accordance with the present invention. While a four-speed gearbox is shown in the drawings, it is understood that the present invention is useful with gearboxes having as few as two speeds as well as gearboxes having five speeds or more. The gearbox 10 broadly includes an input shaft 12, a countershaft 14, an output shaft 16, and a selector mechanism 18. The input shaft 12 is preferably coaxial with the output shaft 16, while both of the latter are preferably oriented parallel and proximate to the countershaft 14.

An input gear 20 is effectively mounted on the input shaft 12 whereby the input shaft 12 is permitted to rotate freely with respect to the input gear 20 except as described hereinafter. A countershaft input gear 22 is positioned in meshing relationship to the input gear 20 and fixed to the countershaft 14 by forging, splines, a key or the like so that rotation of the countershaft input gear 22 results in consequent rotation of the countershaft 14. The countershaft 14 carries at least one and preferably a plurality of change-speed gears which are shown in FIG. 1 as 1st change-speed gear 24, 2nd change-speed gear 26, and 3rd change-speed gear 28. Each of the change-speed gears 24, 26 and 28, as well as reverse gear 30, are fixed for rotation with the countershaft 14.

Correspondingly, a plurality of output gears are positioned on the output shaft 16 for free rotation therewith, except when locked to the output shaft as is conventional in synchromesh gearboxes. These include 1st output gear 32 which constantly intermeshes with 1st change-speed gear 24, 2nd output gear 34 which constantly intermeshes with 2nd change-speed gear 26, and 3rd output gear 36 which constantly intermeshes with 3rd change-speed gear 28. With the exception of reverse gear 30, all of the gears heretofore described are preferably helical gear which are less noisy and susceptible to damage. A reverse output gear 38 is also freely rotatable about the output shaft 14, and is operatively connected to the reverse gear 30 through an idler gear, not shown, as is conventional.

The selector mechanism includes a shift lever 40, a selector head 42, and a plurality of shift rods 44, 46 and 48. Each of the shift rods 44, 46 and 48 mount a selector fork thereon. As shown in the drawing, shift rod 44 carries selector fork 50 for slidable movement therealong for selecting between third and fourth gears, while selector fork 52 slidable along shift rod 46 is used to select between first and second gears. Each fork 50 and 52 is connected to a respective synchronizing hubs 54 and 56. The synchronizing hubs 54 and 56 each include a neutral position, as well as engaged positions when moved forwardly or rearwardly along the output shaft 16. As is known to those skilled in the art, the synchronizing hubs 54 and 56 each include an outer dog sleeve 58 presenting a circumscribing slot 60 for receiving the arms of the respective selector fork therein, as well as a sliding collar 62. The dog sleeve 58 includes circumferentially positioned dogs 64 which are sized correspondingly with the dog teeth of the synchronizing cone of the respective output gear (1st, 2nd or 3rd) with which they are to engage. Synchronizing hub 54 locks 3rd output gear 36 to the output shaft 16 when shifted rearwardly, while locking the output shaft 16 to the input shaft 12 for operation in the direct drive mode when shifted forwardly so that the conically toothed shoulder 66 of synchronizing hub 54 slides over the external, conical splines 68 of engagement sprocket 70, as shown in FIG. 2.

The input gear 20 is fixed to a hub 72 which is externally splined but provided with a smooth inner bore whereby both the hub 72 and the input gear 20 are free to rotate relative to the input shaft 12. The rearwardly oriented end (to the right in FIGS. 5 and 6) of the hub 72 also serves to receive the smoothly surfaced forward end of the output shaft 16 therewithin. Roller bearings or the like may be positioned between the hub 72 and the input shaft 12 to further reduce friction between the input shaft 12 and the hub 72. The splines along the outside of the hub 72 hold the input gear 20 for rotation therewith. Engagement sprocket 70 is not connected to the hub 72, but rather is provided with internal teeth 73 for holding to the rearmost, splined portion of the input shaft 12. The engagement sprocket 70 is thus mounted in driven relationship to the input shaft, and also it is effectively rotationally independent from the input gear 20, except when operatively connected to an engagement slider 74. The splines extending longitudinally along the hub 72 also serve as guides for the engagement slider 74, which is biased toward engagement sprocket 70 by a helical spring 76.

The engagement slider 74 is provided with a radially outward circumscribing ear 78 which projects radially beyond the conical splines 68 of the engagement sprocket 70. In addition, the engagement slider 74 presents circumferentially spaced, rearwardly projecting fingers 80 which are positionable within corresponding circumferentially spaced openings 82 on engagement sprocket 70. The ear 78 is engageable by the sliding collar 62 of the synchronizing hub 54 when the latter is shifted forwardly into the direct drive mode. When so shifted, there is insufficient frictional force between the ear 78 and the synchronizing hub 54, and the input shaft 12 is thus free to turn independently of the hub 72 and the input gear 20 mounted thereon. At the same time, the input shaft 12 is rotatably couple to the output shaft 16 by the engagement between the toothed shoulder 66 of the synchronizing hub 54 and the conical splines 68, and the engagement between the internal splines on the synchronizing hub 54 and the external splines on the output shaft 16. Correspondingly, when the synchronizing hub is not shifted into the direct drive mode (i.e., in either the neutral or 3rd gear engaging position as shown in FIG. 3), the spring 76 pushes the engagement slider 74 rearwardly whereby the engagement slider 74 is locked to the engagement sprocket 70. Because the engagement sprocket 70 is rotationally locked to the input shaft 12 and the engagement slider is rotationally locked to the input gear 20 through the hub 72, the input shaft 12 drives the input gear 20 and thus the countershaft 14 and those gears connected thereto.

The gearbox 10 operates to effectively operationally isolate the input gear 20 from the input shaft 12 when in a direct drive mode (FIG. 4), and thus functionally disengage the countershaft 14 from the input shaft 12 when fourth gear (direct drive) is selected. This is accomplished in the direct drive mode as the input shaft 12 is locked to the output shaft 16 by the movement of the synchronizing hub 54 over the conical splines 68 of the engagement sprocket while also rotationally locked to the splined portion of the output shaft 16 by the internal splines 84 of the sliding collar In the second embodiment of the present invention, a gearbox 90 is provided which in many respects is similar to the gearbox 10. That is to say, the gearbox 90 includes an input shaft 92, a countershaft 94, an output shaft 96 and a gear selector 98. In addition, the input shaft is provided with an input gear 100, but in contrast to the gearbox 10, the input gear 100 is fixed to the input shaft 92 and always rotates therewith. Output gears 102, 104, and 106 correspond respectively to 1st gear, 2nd gear and 3rd gear, and are fixed to the output shaft 96, while change-speed gears 108, 110 and 112 mesh with output gears 102, 104 and 106, respectively and are also fixed to the countershaft 94.

A countershaft input gear 114 is provided for driving countershaft 94 from input gear 100 with which the countershaft input gear mates. However, the countershaft input gear 114 is operatively decouplable from the countershaft 94 when the selector 98 is moved into direct-drive, which in this example is "4th gear", it being understood that additional gears may be provided between the direct-drive relationship and 1st gear. This decoupling relationship between the countershaft input gear 114 and the countershaft 94 is provided by the provision of a linkage 116 which effectively connects the selector 98 to a hub 118 shiftable along the countershaft 94. While various linkage relationships may be used, in the example shown in FIGS. 7, 8 and 9, the linkage 116 is connected to a fork 120 which is coupled to a synchromesh hub 122 moveable between a rearward position for connecting 3rd gear output gear 106 to rotate with the output shaft 96, and a forward position which engages the direct drive mode wherein the input shaft 92 is connected directly to the output shaft 96. For clarity, only the synchromesh hub 122 is shown, it being understood that the gearbox 90 includes a second synchromesh hub for connecting output gear 102 or 104 with the output shaft 96 when either 1st gear or 2nd gear, respectively, is selected by the gear selector 98.

The linkage 116 includes a trailing arm 124 extending rearwardly from the fork 120 which presents an elongate opening 126 for receiving a pin 128 therein. The pin 128 is connected to toggle link 130. Toggle link 130 is pivotally mounted on pivot pin 132. A link arm 134 is pivotally connected to the rearward end of the toggle link 130. The link arm 134 includes a lower end which is pivotally connected to pivot leg 136, which presents a shift pin 138 at the lower end thereof. Shift pin 136 is received within a U-shaped yoke 140 which is mounted to rod 142. Rod 142 is held by journal 143 which permits the rod to move only forwardly and rearwardly. The rod 142 include a shift fork 144 fixed to the forward end thereof, the shift fork 144 being received by a circumscribing slot 146 in the hub 118. A kingpin 148 connects the stationing arm 150 carrying pin 128 to the gearbox case 152 for holding the linkage 116 in position.

Figure 8:
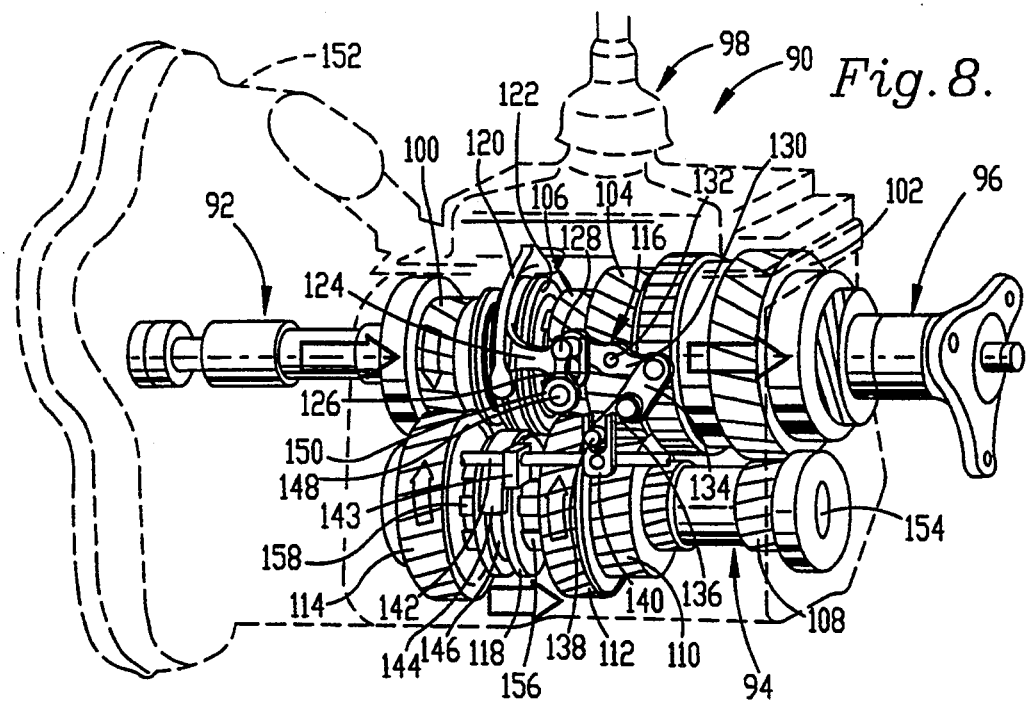
FIG. 8 is a diagrammatic view similar to FIG. 7 but showing the linkage and hub shifted into position for driving the countershaft.
Figure 9:
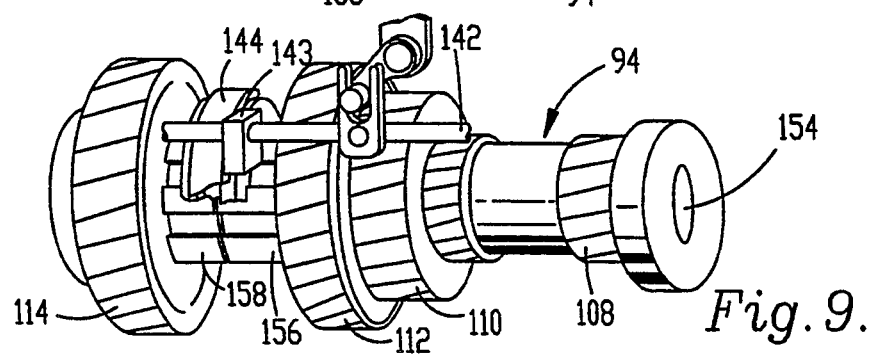
FIG. 9 is a fragmentary diagrammatic view of the second embodiment showing the countershaft input gear and the countershaft, with portions of the hub broken away for clarity.

A central shaft 154 runs through both the countershaft 94 and the countershaft input gear 114, so that both are free to turn about a common axis. The countershaft 94 includes a splined section 156 at its forward end, and the countershaft input gear 114 includes a splined rear section 158. The hub 118 is internally splined and is of sufficient width to connect the countershaft input gear to the countershaft 94 whereby the latter may be driven by the former. FIGS. 7, 8 and 9 are to a degree simplified in that such splinage provides for no synchronization and thus might be suitable only for racing applications, and even in those circumstances the ends of the splines where the countershaft input gear 114 meets the countershaft 94 would be tapered. The connection between the countershaft input gear 114 and the countershaft 94 could readily include the provision for cone clutches and dogs for mating with a dog sleeve on the hub 118 such that a synchromesh connection could be effected.

In use, when the driver selects 1st, 2nd or 3rd gear, the gear selector 98 serves to position the fork 120 in either its neutral or rearward positions. In these positions, the linkage 116 holds the shift fork 144 in a forward position, with the hub 118 connecting the countershaft 94 and the countershaft input gear 114 as is shown in FIG. 8. When the driver selects the direct drive mode as shown in FIG. 7 (4th gear in the gearbox 90 as illustrated), the fork 120 moves forwardly. In so doing, the forward end of the toggle link 130 moves down so that the toggle link 130 assumes an almost horizontal orientation. This exerts a corresponding upward force on the rearward end of the toggle link 130 to move link arm 134 upwardly. This causes the yoke 140 to move to the rear and with it moves the fork 144. When the fork 144 and the hub 118 move to the rear, the hub 118 moves off the splined rear section 158 of the countershaft input gear 114 and thus disengages the countershaft 94 from the countershaft input gear. Thus, the countershaft 94 and the change-speed gears mounted thereon no longer exert a load on the input shaft 92 and more of the power supplied to the input shaft is put to effective and efficient work output.

The third embodiment of the present invention is shown in FIGS. 10, 11 and 13. Gearbox 160 exemplifies this third embodiment and again includes an input shaft 162, countershaft 164, output shaft 166, and gear selector 168 as is conventional. Input shaft 162 includes an input gear 170 with input shaft 162 freely rotatable therein. Input gear 170 includes a forwardly extending sleeve 172 which presents a smooth inner bore 174. The outer surface 176 of the sleeve 172 includes a smooth section 178 at the rearward end and a splined portion 180 at the forward end, best seen in FIG. 13. Countershaft 164 includes a countershaft input gear 182 fixed thereto, as well as change-speed gears 184, 186 and 188 correspondingly respectively to 1st gear, 2nd gear and 3rd gear. Each of the change-speed gears is fixed to the countershaft 164. Output shaft 166 mounts output gears 190, 192 and 194 thereon each being freely rotatable about the output shaft 166 except when coupled thereto by a synchronizing hub 196 for shifting along a splined section 198 of output shaft 166 between 3rd gear and direct drive as is conventional in synchromesh gearboxes. In this regard, the rearward end of input shaft 162 presents longitudinally extending splines 200 for mating with the synchronizing hub 196, so that the synchronizing hub 196 connects the input shaft 162 to the output shaft 166 when a selector fork moves the synchronizing hub into the position shown in FIG. 11. In the neutral or 3rd gear position shown in FIG. 12, the fork has moved the synchronizing hub 196 rearward so that the input shaft 162 is not directly connected to the output shaft. It is to be understood that the cone clutches and dog gears normally present in a synchromesh gearbox have been omitted from FIGS. 10, 11 and 12 for clarity, but that they would be employed in the present invention for normal use. In racing applications, synchronizers are sometimes omitted (as are some of the output gears and change-speed gears), and in such uses the synchronizing hub 196 would be a simple internally splined sleeve. The synchronizing hub for selecting 1st or 2nd gear is not shown in FIGS. 10-12 for clarity, but it is to be understood that such a synchronizing hub would be provided and connected to the gear selector 168 as is conventional. The gearbox 160 is housed within case 202 as is conventional.

In the gearbox 160, the input gear 170 is fixed for rotation with the input shaft by a throwout bearing, such as hydraulic throwout bearing 204, and a clutch unit 206. The hydraulic throwout bearing 204 is actuated by a supply of fluid under pressure from a master cylinder actuated by a clutch pedal, as is conventional, and includes a spring return to bias the throwout bearing 204 away from the clutch unit 206. An exemplary hydraulic throwout bearing for use in the present application is provided by Tilton Engineering of Buellton, Calif., as part no. T-61501.

Clutch unit 206 includes a drive flange 208 which is internally splined for mating with splined portion 180. Drive flange 208 is attached by bolts 210 (preferably provided with covering sleeves) to wear plate 212 and pressure plate 214. Pressure plate 214 is maintained in alignment by bolts 210. Pressure plate 214 is also shiftable forwardly and rearwardly along bolts 210. A clearance is provided between both pressure plate 214 and wear plate 212 so that the input shaft 162 does not touch either the pressure plate 214 or the wear plate 212. A clutch disc 216 is provided with internal splines and is thus rotatably fixed on the splined portion 180, and is shiftable therealong for engagement by wear plate 212 and pressure plate 214 when engaged by the throwout bearing 204. A bearing retainer 218 is positioned between the case 200 and the sleeve portion 172 of the input gear 170 for holding ball bearings 220 for minimizing friction between the sleeve 172 and the case 202. Additionally, needle bearings may be positioned between the bearing retainer 218 and the input gear 170 to resist longitudinal movement of either component and reduce friction. The rear end of the input shaft presents a central receiver 222 for locating a pilot 224 at the forward end of the output shaft 166 therein.

FIGS. 10 and 12 show the gearbox 160 in the change-speed mode when the gear selector 168 is placed in 3rd gear position. In this position, the clutch unit 206 is engaged and the throwout bearing 204 pushes the pressure plate 214 to hold the clutch disc 216 against the pressure plate 214 and the wear plate 212. In so doing, the clutch disc 216, being splined to the input shaft 162, turns with the input shaft and is frictionally connected to the wear plate 212 and drive flange 208. The drive flange 208 is splined to the sleeve portion 172 of the input gear 170 and thus the input gear 170 rotates with the input shaft 162. This in turn drives the countershaft input gear 182 and the countershaft 164. When the countershaft 164 rotates, it causes the change speed gears 184, 186 and 188 to rotate therewith, and in this synchromesh gearbox, the output gears 190, 192 and 194 are also driven. However, only output gear 194 is locked to the output shaft by the action of the synchromesh hub 196, and thus the output shaft 166 turns with output gear 194.

To engage the direct drive mode (4th gear herein), the driver moves the shift lever of the gear selector 168 to 4th gear, which causes the fork to move the synchromesh hub 196 forward to disengage output gear 194 and move to a position simultaneously engaging splined portion 200 of input shaft 162 and splined section 198 of output shaft 166. This causes the output gear 166 to operate in direct drive relationship to input shaft 162. At the same time, the driver lifts up on the clutch pedal to release the pressure supplied to the hydraulic throwout bearing 204. This in turn releases the frictional force holding the wear plate 212 and pressure plate 214 against the clutch disc 216 whereby the clutch disc 216 no longer rotationally drives the wear plate 212, pressure plate 214 and drive flange 208. This permits the input shaft 162 to rotate freely of input gear 170, so that the countershaft 164 is no longer driven by the input shaft and input gear.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the liberal scope of the invention as set out in the following claims.

I claim:

1. An automotive gearbox for receiving power input from an automobile engine and for transferring power output to a rotatable output shaft of the gearbox and for enabling selection between a direct drive mode and at least one change-speed mode, said gearbox comprising:
   a rotatably mounted input shaft for receiving power input from the engine;
   a rotatably mounted countershaft;
   an input gear mounted on said input shaft;
   a plurality of output gears mounted on said output shaft for selective positive rotational engagement therewith;
   a countershaft input gear in constant meshing engagement with said input gear;
   a plurality of change-speed gears mounted on said countershaft in operatively driving constant meshing engagement with respective ones of said plurality of output gears;
   means for selectively transferring power from said input shaft either directly to said output shaft in a direct drive mode or alternatively through said countershaft by positively engaging one of said output gears with the output shaft in a change-speed mode and said means for selectively transferring power from said input shaft includes a synchromesh hub shiftably movable between a position for operatively rotatably coupling one of said output gears to said output shaft and a position for operatively rotatably coupling said input shaft to said output shaft; and
   means for selectively decoupling said countershaft and said change-speed gears from operative driven engagement by said input shaft when said output shaft is driven directly by said input shaft,
   wherein said means for selectively decoupling includes means for selectively operatively decoupling said input gear from rotatably driven engagement by said input shaft, whereby said input shaft is freely rotatable within said input gear, and said means for selectively decoupling said input gear is actuated by said means for selectively transferring power from said input shaft when said input shaft is operably coupled to said output shaft in a direct drive mode,
   said means for selectively decoupling said input gear further including a drive member rotatably fixed to said input shaft, and a longitudinally shiftable slider element operatively rotatably fixed relative to said input gear and selectively couplable with said drive member, said slider element being shiftable between a first position rotatably coupled to said drive member when said means for selectively transferring power is in other than said position for operatively rotatably coupling said input shaft to said output shaft and a second position wherein said slider element is disengaged from said drive member when said means for selectively transferring power is in said position for operatively rotatably coupling said output shaft.

2. An automotive gearbox as set forth in claim 1, including a hub positioned on said input shaft, said hub carrying said input gear and said slider for permitting free rotation of said input shaft therein.

3. An automotive gearbox as set forth in claim 1, wherein said synchromesh hub presents a toothed shoulder thereon for engaging a correspondingly toothed member on said drive member when said synchromesh hub is shifted into said position for operatively rotatably coupling said input shaft to said output shaft.

4. An automotive gearbox as set forth in claim 3, wherein said slider presents a plurality of fingers for insertion into corresponding openings in said drive member.

5. An automotive gearbox as set forth in claim 4, including a spring for biasing said slider toward said drive member wherein said fingers are inserted into said openings.

6. An automotive gearbox as set forth in claim 5, wherein said countershaft input gear is fixed to said countershaft.

7. An automotive gearbox for receiving power input from an automobile engine and for transferring power output to a rotatable output shaft of the gearbox and for enabling selection between a direct drive mode and at least one change-speed mode, said gearbox comprising:
   a rotatably mounted input shaft for receiving power input from the engine;
   a rotatably mounted countershaft;
   an input gear mounted on said input shaft;
   at least one output gear mounted on said output shaft for selective positive rotational engagement therewith;
   a countershaft input gear in constant meshing engagement with said input gear;
   at least one change-speed gear mounted on said countershaft in operatively driving constant meshing engagement with said one output gear;
   means for selectively transferring power from said input shaft either directly to said output shaft in a direct drive mode or alternatively through said countershaft by positively engaging said one output gear with the change-speed mode;
   means for selectively decoupling said countershaft and said at least one change-speed gear from operative driven engagement by said input shaft when said output shaft is driven directly by said input shaft; and
   means for selectively operatively decoupling said input gear from rotatably driven engagement by said input shaft, whereby said input shaft is freely rotatable within said input gear,
   said means for selectively decoupling said countershaft and said at least one change-speed gear including a clutch wherein said clutch includes a clutch disc rotatably coupled to said input shaft and a pressure plate rotatably coupled to said input gear.

8. An automotive gearbox as set forth in claim 7, wherein said clutch plate is operatively disengaged from said pressure plate in said direct drive mode and engaged in said change-speed mode.

9. An automotive gearbox as set forth in claim 8, wherein said countershaft mounts a plurality of change-speed gears thereon, and said output shaft mounts a plurality of output gears thereon in meshing engagement with respective ones of said plurality of change-speed gears.

10. An automotive gearbox as set forth in claim 9, wherein said countershaft input gear is fixed to said countershaft.

11. An automotive gearbox for receiving power input from an automobile engine and for transferring power output to a rotatable output shaft of the gearbox and for enabling selection between a direct drive mode and at least one change-speed mode, said gearbox comprising:
   a rotatably mounted input shaft for receiving power input from the engine;
   a rotatably mounted countershaft;
   an input gear mounted on said input shaft;
   at least one output gear mounted on said output shaft for selective positive rotational engagement therewith;
   a countershaft input gear in constant meshing engagement with said input gear;
   at least one change-speed gear mounted on said countershaft in operatively driving constant meshing engagement with said one output gear;
   means for selectively transferring power from said input shaft either directly to said output shaft in a direct drive mode or alternatively through said countershaft by positively engaging said one output gear with the output shaft in a change-speed mode; and
   means for selectively decoupling said countershaft and said at least one change-speed gear from operative driven engagement by said input shaft when said output shaft is driven directly by said input shaft,
   wherein said countershaft input gear is rotatably independent from said counter-shaft and wherein said means for selectively decoupling said countershaft and said at least one change-speed gear includes means for rotatably coupling and decoupling said countershaft input gear to said countershaft.

12. An automotive gearbox as set forth in claim 11, wherein said means for rotatably coupling and decoupling said countershaft input gear to said countershaft is operatively connected to said means for selectively transferring power, wherein selecting said direct drive mode simultaneously decouples said countershaft input gear from said countershaft.

13. An automotive gearbox as set forth in claim 12, wherein said means for rotatably coupling and decoupling said countershaft input gear includes a splined hub for simultaneously engaging splines located on said countershaft input gear and said countershaft.

14. An automotive gearbox as set forth in claim 13, wherein said countershaft mounts a plurality of change-speed gears thereon, and said output shaft mounts a plurality of output gears thereon in meshing engagement with respective ones of said plurality of change-speed gears.

15. An automotive gearbox for receiving power input from an automobile engine and for transferring power output to an output shaft and for enabling selection between direct drive through said gearbox and alternatively through at least one change-speed gear, said gearbox comprising:
   an input shaft for receiving power input from the engine;
   a countershaft positioned proximate to and parallel with said input shaft;
   an output shaft coaxially aligned with said input shaft;
   an input gear freely rotatable about said input shaft;
   at least one output gear fixed to said output shaft;
   a countershaft input gear fixed to said countershaft and operatively coupled to said input gear;

at least one change-speed gear fixed to said countershaft in meshing engagement with said at least one output gear;

means for selectively coupling and uncoupling said input shaft to said output shaft in direct-drive relationship; and means for selectively coupling and uncoupling said input gear for rotation with said input shaft.

16. An automotive gearbox for receiving power input from an automobile engine and for transferring power output to a rotatable output shaft of the gearbox and for enabling selection between a direct drive mode and at least one change-speed mode, said gearbox comprising:

a rotatably mounted input shaft for receiving power input from the engine;

a rotatably mounted countershaft;

an input gear mounted on said input shaft;

at least one output gear mounted on said output shaft for selective positive rotational engagement therewith;

a countershaft input gear in constant meshing engagement with said input gear;

at least one change-speed gear mounted on said countershaft in operatively driving constant meshing engagement with said one output gear;

means for selectively transferring power from said input shaft either directly to said output shaft in a direct drive mode or alternatively through said countershaft by positively engaging said one output gear with the output shaft in a change-speed mode;

means for selectively decoupling said countershaft and said at least one change-speed gear from operative driven engagement by said input shaft when said output shaft is driven directly by said input shaft; and means for selectively decoupling said input gear from rotatably driven engagement by said input shaft whereby said input shaft is freely rotatable within said input gear, said means for selectively decoupling said input gear including a drive member rotatably fixed to said input shaft and a longitudinally shiftable slider element operatively rotatably fixed relative to said input gear selectively couplable with said drive member.

* * * * *